(12) United States Patent
Jacobs

(10) Patent No.: US 10,729,277 B2
(45) Date of Patent: Aug. 4, 2020

(54) APPARATUS FOR BREWING COFFEE AND OTHER BREWED BEVERAGES WITH INFUSION AND AGITATION

(71) Applicant: Robert David Jacobs, Franklin, NY (US)

(72) Inventor: Robert David Jacobs, Franklin, NY (US)

( * ) Notice: Subject to any disclaimer, the term of this patent is extended or adjusted under 35 U.S.C. 154(b) by 200 days.

(21) Appl. No.: 15/688,058

(22) Filed: Aug. 28, 2017

(65) Prior Publication Data

US 2019/0059634 A1 Feb. 28, 2019

(51) Int. Cl.
*A47J 31/40* (2006.01)
*A47J 31/52* (2006.01)
*A47J 31/06* (2006.01)
*A47J 31/56* (2006.01)
(Continued)

(52) U.S. Cl.
CPC ............ *A47J 31/407* (2013.01); *A23F 5/262* (2013.01); *A47J 31/0642* (2013.01); *A47J 31/0689* (2013.01); *A47J 31/52* (2013.01); *A47J 31/56* (2013.01); *B65D 85/8043* (2013.01)

(58) Field of Classification Search
CPC .. A47J 31/407; A47J 31/0642; A47J 31/0689; A47J 31/52; A47J 31/56; A23F 5/262; B65D 85/8043
See application file for complete search history.

(56) References Cited

U.S. PATENT DOCUMENTS 1,602,632 A * 10/1926 Zorn ..................... A23F 5/26
 210/210
2,304,004 A * 12/1942 Low ..................... A47J 31/043
 99/318

(Continued)

FOREIGN PATENT DOCUMENTS

DE 4317902 * 12/1994
GB 509740 * 7/1939

OTHER PUBLICATIONS

English Translation for DE4317902 published Dec. 1994.*
(Continued)

*Primary Examiner* — Anthony J Weier
(74) *Attorney, Agent, or Firm* — Hoffman Warnick LLC

(57) ABSTRACT

An apparatus and method for brewing coffee of higher quality and better taste than any apparatus and method currently available, while also enabling users to utilize less coffee grounds per brewing cycle, thereby achieving significant cost savings for users. A basket that houses a packet of coffee grounds is housed within a chamber that stores water. The basket is fabricated so that water may enter therein and exit therefrom, and the packet of coffee grounds enables water and natural coffee oils to penetrate the packet, but does not allow coffee grounds to escape the packet. The water chamber is filled with water that is gradually heated from at or around tap temperature to approximately boiling. While the water in the chamber is heated, the basket is agitated. This causes the gradually heating water to enter the basket and agitate the packet, thereby extracting natural coffee oil from the grounds stored within the packet, which creates brewed coffee. The entire brewing process may be controlled by electronic controlling means.

14 Claims, 7 Drawing Sheets

(51) Int. Cl.
*A23F 5/26* (2006.01)
*B65D 85/804* (2006.01)

(56) References Cited

U.S. PATENT DOCUMENTS

| | | | | |
|---|---|---|---|---|
| 2,631,522 | A * | 3/1953 | Joy | A47J 31/20 99/287 |
| 2,858,762 | A * | 11/1958 | Wade | A47J 31/20 99/287 |
| 3,020,823 | A * | 2/1962 | Musso | A47J 31/20 99/287 |
| 3,023,691 | A * | 3/1962 | Turner | A47J 31/22 99/287 |
| 3,654,852 | A * | 4/1972 | Rosan, Sr. | A47J 31/20 99/323 |
| 4,401,014 | A * | 8/1983 | McGrail | A47J 31/20 99/283 |
| 5,676,041 | A | 10/1997 | Glucksman et al. | |
| 5,957,035 | A * | 9/1999 | Richter | A23F 5/26 426/433 |
| 6,085,638 | A | 7/2000 | Mork et al. | |
| 2002/0121197 | A1 * | 9/2002 | Mercier | A23F 3/18 99/279 |
| 2003/0202787 | A1 | 10/2003 | Wu | |
| 2007/0278202 | A1 | 12/2007 | Long et al. | |
| 2013/0055901 | A1 * | 3/2013 | Zhang | A47J 31/20 99/279 |
| 2019/0059412 | A1 * | 2/2019 | Jacobs | A47J 31/52 |

OTHER PUBLICATIONS

Related U.S. Appl. No. 15/806,692, Non-Final Office Action dated Dec. 12, 2019, 17 pages.
Related U.S. Appl. No. 15/806,692, Final Office Action dated Apr. 7, 2020, 12 pages.

* cited by examiner

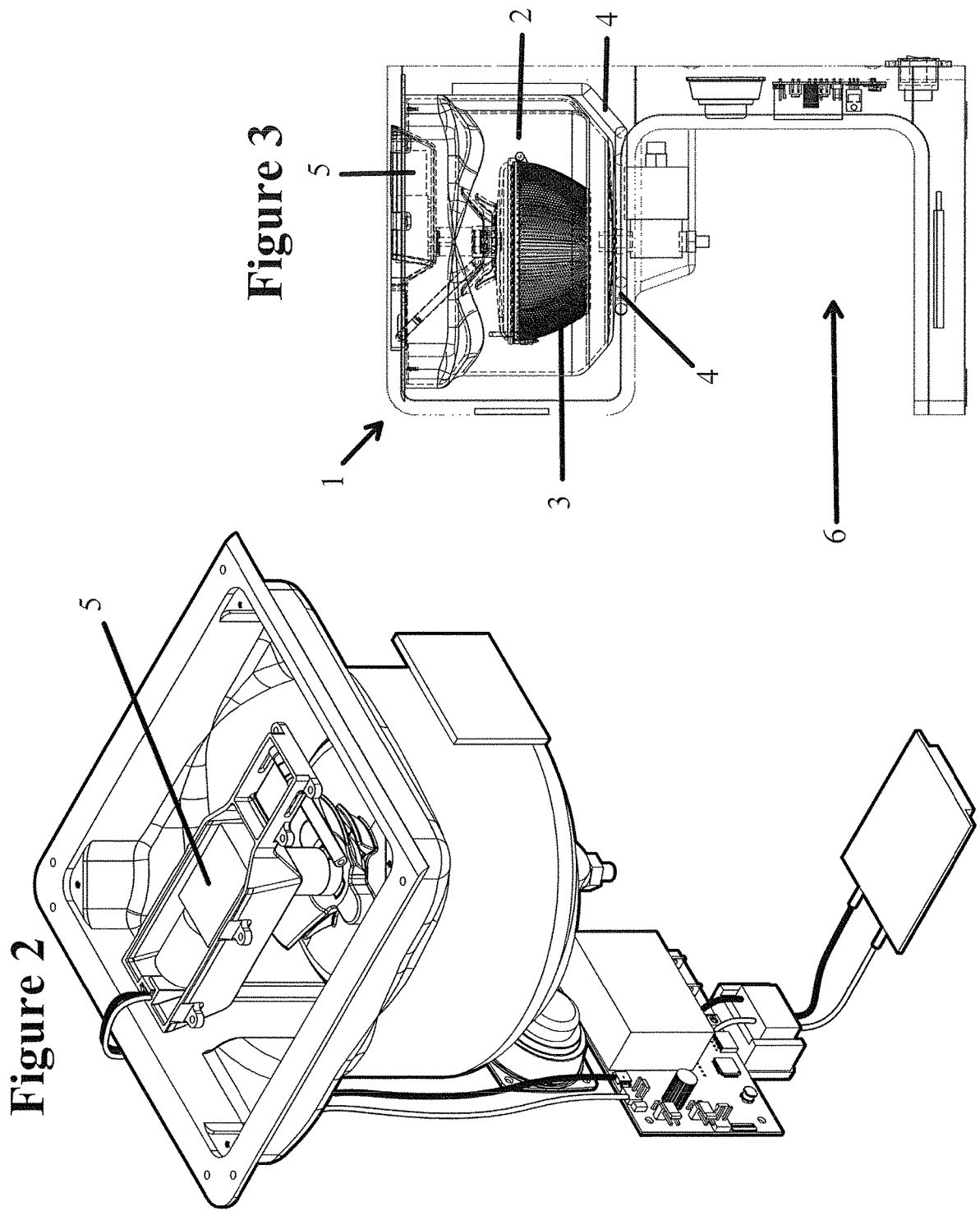

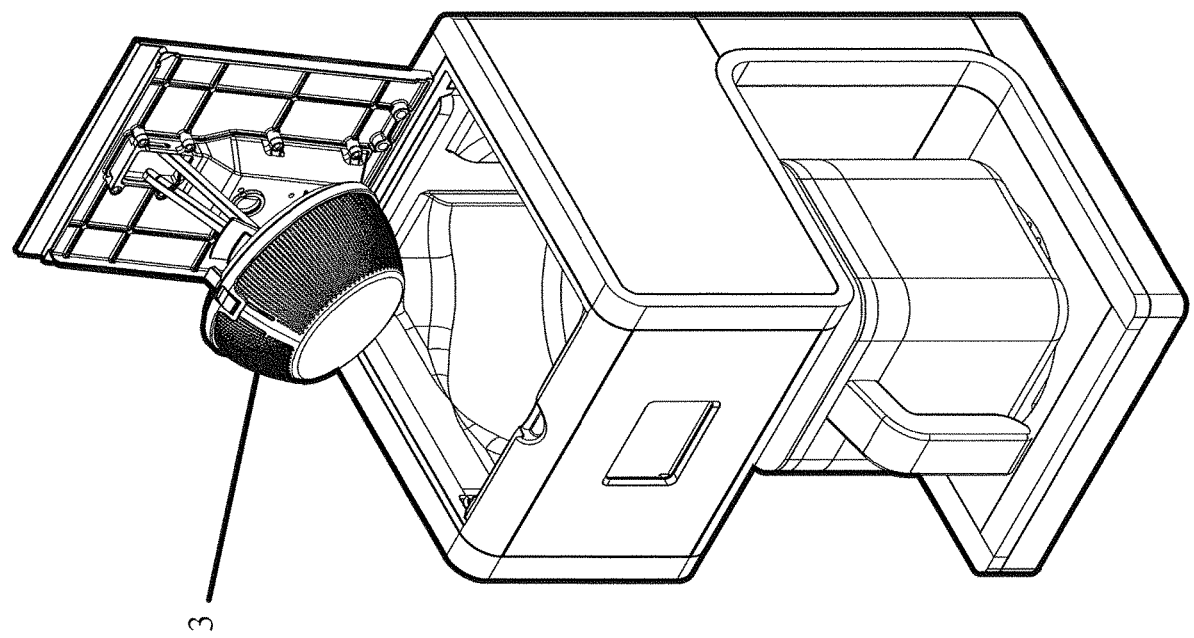

APPARATUS FOR BREWING COFFEE AND OTHER BREWED BEVERAGES WITH INFUSION AND AGITATION

FIELD OF THE INVENTION

The invention relates to brewing coffee and other beverages and, more specifically, to providing an apparatus and method for brewing coffee that is more efficient than the coffee brewing systems of the prior art and that produces a higher quality coffee than can be produced by the coffee brewing systems that the industry currently offers.

BACKGROUND OF THE INVENTION

Coffee's Ubiquity & Availability

Coffee is one of the most popular drinks in America. A 2015 Gallup poll found that nearly two-thirds (64%) of Americans drink at least one cup of coffee per day. See http://www.gallup.com/poll/184388/americans-coffee-consumption-steady-few-cut-back.aspx. More telling, the same poll found that the average coffee drinker in America drinks nearly three full cups of coffee each and every day. Id.

Given coffee's wild popularity across the country, it is not surprising that coffee drinkers have more options for obtaining a cup of coffee than ever before. Today, coffee drinkers can purchase a cup of coffee at name-brand commercial coffee shops, like Starbucks and Dunkin Donuts; gas stations; street vendors; at fast food locations, such as McDonald's (as well as at almost any food serving establishment); and at numerous other locations (all locations at which a coffee drinker may purchase coffee outside of their home are collectively referred to hereafter as "coffee shops"). And research suggests that coffee drinkers indeed swarm coffee shops. Trade magazines report that the average Starbucks serves over 500 customers each day and Dunkin Donuts reports that is sells nearly 2 billion cups of coffee in America each year. http://www.businessinsider.com/how-many-customers-starbucks-will-have-2013-10; https://news.dunkindonuts.com/news/brand-keys-names-dunkin-donuts.

Despite the ubiquity of coffee shops, the overwhelming majority of American coffee drinkers still make their coffee at home. See, e.g., https://www.aol.com/2011/01/25/savings-experiment-the-perks-of-brewing-versus-buying-coffee/. Making coffee at home offers numerous advantages. The most notable advantage is cost: making coffee at home is drastically cheaper than buying it at coffee shops. The average cost of a cup of coffee that is purchased on-the-go ranges between $2-$5. The average cup of coffee brewed at home, however, costs on average only 16 to 22 cents depending on how much you spend per pound to buy the coffee. For example, at $8 per pound (a common price for many types of coffee in typical US grocery stores), the average 10 cup per day user spends $0.20 per cup. Not surprisingly, numerous publications that advise consumers about how to increase their savings counsel consumers to make coffee at home rather than paying the comparatively high prices charged by coffee shops.

But there is a significant drawback that at-home coffee drinkers must face: poor quality and taste (this can also be a significant problem at coffee shops). Many people believe that the beans that a person uses will dictate the quality and taste of coffee brewed at home. But while bean quality is certainly a factor that impacts taste, the factor that most overwhelmingly influences the quality and taste of coffee is the method of brewing.

The Science of Making Coffee

Humans have been brewing and drinking coffee for more than 500 years. But over that time, the science of making coffee has not changed significantly. When coffee is "brewed," technically what the user is doing is using hot water to extract natural oil from coffee beans. This oil infuses with the hot water used to extract the oil, and the resultant oil-water mixture is what we refer to as "brewed coffee." (Although "cold brewing" has become popular in recent years, cold brewing coffee involves a wholly different brewing process than is used for brewing hot coffee).

As explained further below, the invention disclosed herein utilizes a process known as "agitated infusion" that is not utilized by any coffee brewing system that is currently available. Agitated infusion is the process of immersing coffee grounds in water that is at or about tap temperature, gradually heating the water to approximately boiling, and agitating the grounds within the water while it is heated to approximately boiling. This gradual raising of the water temperature to near 212 degrees, combined with agitation (as explained herein), achieves the maximum extraction of oil from the coffee grounds, which results in two significant advantages: (i) the brewed coffee that is produced is richer in flavor: and (ii) because the infusion process extracts significantly more oil from the coffee grounds than other coffee brewing processes, the user is able to achieve a richer tasting brewed coffee using less coffee grounds, which is more efficient and results in the user saving significant amounts of money. Any variation from the agitation infusion method, such as using water heated to a lower temperature or failing to utilize the gradual heating process and agitation (or any other variation), will result in the brewing process being unable to extract the very high percentage of oil from the grounds that can be extracted using agitated infusion.

The industry's most relevant and widely utilized methods of brewing coffee, none of which utilize the agitation infusion process as present invention does, are discussed below.

Turkish Coffee

Turkish coffee is among the oldest methods of brewing coffee and the process of making Turkish coffee is well known. For a good example of the prior art's discussion of Turkish coffee, see WO2007116350 A1 (Suleyman, et al). In short, to make Turkish coffee, the user places water into a carafe (or other receptacle) and places the carafe over heat (such as the flame of a stove or, in past times, the flame of a fire). Then the user heats the water to a medium-high temperature. Once the water reaches that medium-high temperature, the user adds finely ground coffee to the carafe. The user then stirs the coffee within the carafe and allows the water with the coffee therein to continue to heat; this process extracts the oil from the coffee so that the oil begins to mix with the water, which forms brewed coffee. Once the coffee grounds begin to sink, the user stirs the coffee-water mixture again; this stirring extracts even more oil from the coffee grounds and creates a consistent brewed coffee. As the user stirs, the coffee-water mixture should begin to foam up. Once the coffee-water mixture begins to foam, the user stops stirring and removes the coffee-water mixture from heat. After a short time (approximately 30 seconds), the coffee grounds will settle to the bottom of the carafe and the brewed coffee mixture can be carefully poured into cups and served.

French Press

Among widely utilized coffee makers, French Press systems are generally considered to produce the best tasting coffee. In nearly every survey taken of coffee drinkers, the French Press is thought to be the best brewing method. Not surprisingly, many exclusive restaurants use only the French Press method.

A typical example of the French Press process of brewing coffee is disclosed in U.S. Pat. No. 6,422,133 B1 to Brady. Like making Turkish coffee, a French Press system works by immersing ground coffee (freshly ground coffee is preferred, but not necessary) directly into water—but the remainder of the process is different. In a French Press system, the user pours coffee grounds into the empty French Press carafe. After doing so, the user adds water that has been heated to approximately 212 degrees. The hot water will begin extracting oil from the coffee grounds to form brewed coffee. At this point, some French Press users will stir the grounds within the water in an effort to extract additional oil from the grounds, others do not stir. Whether the grounds are stirred or not, after the water is added the user must wait 3-6 minutes. During this time, the hot water will continue extracting oil from the coffee grounds to create a more robust brewed coffee, but the temperature of the water will decrease quickly and the process of extracting oil will be weakened as the temperature falls. After these 3-6 minutes pass, the user slowly lowers the French Press "plunger" from the top of the carafe to bottom. The head of the plunger is usually designed similar to a "screen," which permits the brewed coffee to pass through while forcing the now used coffee grounds to the bottom of the carafe. Once the brewed coffee is separated from the grounds, the user can pour the coffee out of the carafe and into a mug.

Pour Over

The "pour over" method of brewing coffee is often also lauded as producing high quality coffee. Most often associated with the brand Chemex®, the pour over method involves the steps of heating water to boiling, placing ground coffee within a filter and positioning the filer above a receptacle capable of storing brewed coffee, removing the boiling water from the heat source and pouring it over the coffee grounds so that the water flows through the grounds and into the receptacle. Most pour over users utilize a specific method of pouring the water over the coffee, which may include multiple pouring steps, in an effort to extract the maximum amount of oil from the grounds.

Drip Brewing Systems

There is no doubt that the most utilized coffee brewing system today is the "drip"; drip coffee makers have been a mainstay in the majority of American homes for decades. The standard drip system is described in U.S. Pat. No. 5,001,969 to Moore, et al and brews coffee by spraying hot water over coffee grounds that are held in a filtered basket situated above a carafe. The sprayed hot water trickles downward through the grounds and as it does so the hot water extracts and mixes with the oil from the coffee grounds. There is an opening in the bottom of the basket that houses the filtered coffee grounds. When the water trickling downward through the basket reaches the bottom (and by this time has extracted and mixed with oil from the coffee grounds), the now-formed brewed coffee exits the basket through a hole in the basket's bottom and empties (i.e., drips) into a carafe (or other storage receptacle) that stores the coffee until the user transfers it into a mug for drinking. The storage receptacle usually includes a means for keeping the receptacle and brewed coffee heated. For standard drip systems that utilize a carafe for storing the coffee, the carafe often rests atop a hot plate that keeps the brewed coffee warm.

There are many variations of drip systems designed to suit user preferences and to enhance the quality of the coffee that drip makers brew. For example, U.S. Pat. No. 5,001,969 discloses a drip system that includes timers to permit and regulate automatic brewing cycles that allow the system to brew coffee even when the user is not present. U.S. Pat. No. 4,406,217 to Oota discloses a drip system that includes a mill to grind coffee immediately prior to brewing, the idea being that freshly ground coffee will produce more flavorful coffee. Other variations of drip systems maintain a reservoir of hot water that can be immediately sprayed over the coffee grounds so that the user does not have to wait for water to be heated or an internal "tank" where the brewed coffee is stored, as opposed to a carafe, and the user opens a spigot (or performs a similar function) and the coffee-water mixture drains from the "tank" into the user's mug. This saves the user the trouble of washing a carafe. Despite how drip system may be varied or the "bells and whistles" that may be included for user preference, the majority of drip systems still employ the same process to brew coffee: spraying heated water over coffee grounds, with the water eventually draining into a receptacle from which the coffee is then transferred to the user's mug.

There are, however, a minority one drip system that utilizes a form agitation to brew higher quality coffee. For example, U.S. Pat. No. 6,532,862 to Mork, et al discloses a drip system that utilizes a spinning basket to create centrifugal forces to more thoroughly infuse the coffee grounds with water. Mork also notes additional prior art that utilizes centrifugal forces to more thoroughly infuse the coffee grounds, such as U.S. Pat. No. 5,265,617 to Gilbert and U.S. Pat. No. 1,602,632 to Zorn. Cuisinart has also recently release its DCB-10 Automatic Cold Brewing System, which uses agitation to "cold brew" coffee at a pace that, the company claims, can produce quality cold brew coffee in less than one hour. Because cold brewing uses water that is not heated, the process usually requires far longer to brew coffee than is required to brew hot coffee because cooler water less able to extract oil from coffee than hot water. For example, many cold brew coffees are brewed for several hours or even overnight. The Cuisinart DCB-10 system claims that, through its agitation process, it can brew quality cold brew coffee in less than one hour. As explained further below, even these systems that utilize agitation and infusion do so in a manner unlike and inferior to the invention disclosed herein.

Single-Cup Coffee Brewers

Single-cup coffee makers, such as the Keurig brewing system that is covered by numerous US Patents, including U.S. Pat. Nos. 7,398,726; 7,165,488; 7,347,138; D513,572; 7,377,162; D544,299; 7,360,418; 7,513,192; 8,151,694, have over the last several years become extremely popular because of their convenience and speed. Rather than requiring the user to place coffee grounds in a basket or directly into water within a carafe, single-cup coffee makers use coffee "pods" (these coffee pods are commonly referred to as "K-cups"). The coffee pods are a single-use, premeasured and prepackaged amount of coffee grounds that may be used to brew a single cup of coffee (as opposed to multiple cups of coffee, which can be brewed using the Turkish, French Press, and drip systems discussed above). Single-cup coffee makers heat water to approximately 192 degrees before it inundates the grounds. To initiate the brewing process, a user opens the system's coffee pod chamber and places a pod into the chamber. Next, the user closes the chamber. The chamber is designed so that by closing the chamber with a coffee pod therein, the chamber's structure will pierce the upper portion of the coffee pod from above and pierce the lower portion of the coffee pod from below.

Once the chamber is closed, the user can begin the coffee brewing process, which is usually done simply by pressing a "start" button. This causes the system to pump heated water into the chamber. When the water enters the chamber, it enters the coffee pod via the opening in the pod's upper portion that was created when the chamber closed. Once the water enters the pod, it inundates the coffee grounds contained therein, which extracts and mixes with oil from the grounds to create brewed coffee. The force of water being pumped into the chamber, as well as gravity, force the brewed coffee to flow out of the opening in the bottom of the pod, which is situated above an opening in the bottom of the chamber, and the brewed coffee then flows out of the machine and into the user's mug, which is situated below the opening in the bottom of the chamber.

Shortcomings of Currently Available Coffee Brewing Systems

Unfortunately for consumers, all of the coffee brewing systems currently available are plagued by significant shortcomings that impair the quality of the coffee they produce or make the systems inconvenient for consumers and relatively expensive. A non-exhaustive discussion of significant shortcomings of each system, many of which the present invention seeks to remedy, are explained below.

Turkish Coffee Shortcomings

For most consumers today, the most significant problem of making Turkish coffee is the inconvenience of the brewing process. It is no coincidence that single-cup brewers have exploded in popularity; in today's on-the-go world, putting a pod into the chamber and pressing start is the easiest way to make coffee. In contrast, Turkish coffee requires multiple steps that are comparatively laborious. The user must heat water and then deposit coffee grounds therein. Then the user must continue heating. Not only does this require work from the user, it also requires vigilance. Unlike drip and single-cup systems, where once the brewing process begins the user can simply wait for the coffee to be ready drink, brewing Turkish coffee requires the user to watch over the process from start to finish. Many if not most Americans simply do not have the time in the morning to devote such vigilance to making coffee, as they are preparing for work; preparing children to go to school; assisting spouses with their morning preparations; or caring for pets—for many Americans, each morning involves a combination of these tasks.

Aside from inconvenience, Turkish coffee also inheres several systemic problems for consumers. For example, if the consumer is not vigilant in the water heating process the grounds can remain in boiling water for too long of a time resulting denatured coffee which can be very bitter Another potential problem is that consumers will pour the brewed coffee from the carafe before the coffee grounds have fully settled, which results in consumers drinking coffee grounds, which is undesirable. Still another problem is clean up. Once the brewing process is complete, the user is left with a carafe full of wet, used coffee grounds that must be discarded and the carafe must be cleaned before it may be used to make more coffee.

As far as taste, the principal problem with Turkish Coffee is that the water used to extra oil from the grounds is generally heated to a medium-hot temperature before the grounds are added or is heated for too long. As explained further, infra, an important aspect of the agitated infusion process disclosed herein is the gradual raising of water temperature while coffee grounds are immersed therein. By beginning the brewing process with water heated to a medium temperature (as opposed to the near boiling temperature water that many of the other brewing processes discussed herein utilize), Turkish coffee does, more than any other method of brewing coffee available to consumers to date, utilize the infusion process—but only to a relatively minor degree as compared to the present invention.

French Press Shortcomings

French Press systems suffer from the same convenience problems that plague Turkish coffee: the user must manually heat water, add grounds, and remain vigilant until the process is complete, and cleanup is inconvenient. In addition, most French press carafes are much smaller than drip system carafes. Because the size of the carafe is smaller, and the work and time involved to brew French Press coffee, if a person has house guests (or otherwise needs to make coffee for more than one or two people), a French press system will generally be undesirable. Also French Press coffee makers do not have heating elements to keep the brewed coffee hot.

French Press systems also fail to take advantage of the infusion process. As noted above, when a user pours preheated water into the French Press carafe, the water is already heated to approximately 200+ degrees. Although infusing the grounds in water heated to 200+ degrees will extract more oil than lower temperature coffee brewing methods (such as drip systems and single-cup systems, see infra), failing to employ the infusion process that involves gradually raising the water's temperature and constant agitation means French Press systems will not extract the maximum amount of oil from the grounds, which means the brewed coffee will not be as robust in flavor as it could be. In addition, the water used to brew coffee using a French Press begins to immediately cool once it is removed from the heat source, which further reduces the ability of French Press systems to extract maximum oil from the coffee grounds.

Pour Over Shortcomings

The pour over method suffers shortcomings inherent to both the Turkish method and French Press systems. For one, the user has to undergo the inconvenient process of separately heating water before coffee can be made. Second, the heated water begins to cool as soon as it is removed from the heat, reducing the pour over method's ability to extract oil from the grounds. In addition (and again like French Press), many pour over carafes hold a smaller volume of coffee and lack a heating element (although some pour over carafes are specifically designed so that they may be placed on top of a stove to keep the coffee warm, but this remains a far cry from the heating elements included in some systems, such as those included in many drips).

The pour over method also lacks true agitation. The coffee grounds merely sit stationary in the filter while water is poured over them. And even altering the pouring method does not result in true agitation or immersion.

Drip System Shortcomings

Most drip systems inheres a host of shortcomings. First, the water temperature of most standard drip coffee makers is heated no higher than 170 degrees before it is sprayed over the coffee grounds. This poses two problems. First, by merely preheating water to 170 degrees and spraying it over grounds, drip systems fail to in any way take advantage of the infusion process. Second, water that is heated to 170 degrees is not hot enough to extract anywhere close to the maximum amount of oil from the coffee. To extract the maximum amount of oil, the water temperature must reach approximately boiling. Further, the water begins to cool quickly after being sprayed on to the grounds, which further impairs the ability of most drip systems to extract oil from the grounds.

The second major problem with most drip coffee makers is the process by which they extract the coffee oil. To extract the maximum amount of oil, coffee grounds should be immersed in water and agitated. But most drip systems simply spray hot water on to grounds, which is referred to as "washing" the grounds. When grounds are merely washed in a drip system, the water sometimes only washes the grounds directly below or very close to the nozzle from which the water is sprayed (many drip coffee makers have numerous nozzles). As a result, there are instances when only a fraction of the coffee grounds are fully washed. This means that oil is extracted from only a fraction of the grounds and the coffee brewed therefrom is only a fraction as flavorful as it would be if all of the grounds were completely washed. Besides dampening the coffee's flavor, the inability of most drip systems to extract oil from all of the coffee grounds means that consumers are wasting large amounts of money on coffee grounds that are never actually used to brew coffee. For consumers that buy high quality beans, the day-in, day-out waste of "unused" grounds can equate to a significant amount of wasted income. So in sum, drip brewers force consumers to overspend to brew coffee that has a dampened flavor.

As noted above, a minority of drip systems incorporate a process by which centrifugal force circulates water through the grounds. While this may be an improvement over the spraying and washing method, it is still less effective at extracting oil than the agitation and infusion method disclosed herein. In addition, the centrifugal processes do not employ the gradual heating process disclosed herein; the water in those systems is heated prior to circulating through the grounds. See, e.g., U.S. Pat. No. 6,532,862 to Mork.

Single-Cup System Shortcomings

As noted above, single-cup brewing systems inundate the grounds in the pods with water that is preheated to 192 degrees. While water heated to 192 degree will extract more oil from the grounds than water heated to 178 degrees, 192 degrees is still below the ideal approximately boiling temperature. And like other methods of brewing coffee, because the water is pre-heated to 192 degrees before inundating the grounds, single-cup brewing systems fail to utilize the gradual heating that is involved in the infusion process.

And, of course, single-cup systems only brew a single cup of coffee at a time. While this is often convenient, if a person has house guests or needs to make coffee for many, reliance solely on a single-cup system can be inconvenient. Finally, single-cup systems are generally considered bad for the environment because their use generates millions of used plastic pods that must be discarded.

SUMMARY OF THE INVENTION

The present invention provides an apparatus and method for brewing coffee (and other brewed beverages, such as tea) that is convenient for consumers, efficient, and that fully employs the infusion process and agitation, which extracts the maximum amount of oil from coffee grounds in order to produce a brewed coffee of the highest quality and taste. The apparatus includes a water chamber that holds water. Within the water chamber is a basket that is able to hold a packet of coffee grounds during the brewing process (the coffee grounds used in the brewing process are stored in a "packet", similar to an envelope, that is discussed further infra). The apparatus also includes a means for agitating the basket while the brewing process occurs and a means for heating the water within the water chamber.

Once the user places a packet of coffee grounds into the apparatus basket and adds water to the water chamber, the user may use the apparatus to perform the method of brewing coffee disclosed herein, which is an automated process such that by initiating the apparatus to begin a brewing cycle, the apparatus will begin heating the water in the chamber from tap temperature to approximately boiling while at the same time agitating the packet of coffee grounds that is immersed in the chamber within the water. This heating-agitation process lasts approximately 7 minutes, and once it is complete the brewed coffee exits the water chamber into a carafe (or other storage receptacle) that is situated below the water chamber. The brewed coffee may then be enjoyed by the user. This process takes all of the best elements from Turkish and French Press, and is significantly more efficient in extracting oil from coffee grounds than any method or system of brewing coffee that is currently available. As a result of this increased efficiency, less grounds are required to brew coffee and users can expect money savings of much as $300.00 per year for a person making 10 cups per day using amounts of coffee recommended by various manufacturers.

BRIEF DESCRIPTION OF THE DRAWINGS

The drawings included herewith are not intended to in any way limit the scope of the invention disclosed herein. The drawings are merely included to clarify and exemplify the invention as disclosed and claimed herein

FIG. 2 shows a view of the means for agitating the basket stored within the water chamber.

FIG. 3 shows a cross sectional view of the apparatus.

FIG. 4 shows an isometric view of the apparatus and shows how the apparatus may be opened to remove the basket.

DETAILED DESCRIPTION OF THE INVENTION

The present invention combines all of the best practices (some detailed earlier) for brewing coffee into a single, automatic system that is convenient to use. But before describing the components of the present invention for brewing coffee, it is important to describe how coffee grounds are used in the present invention.

The Packet

Figure 8:
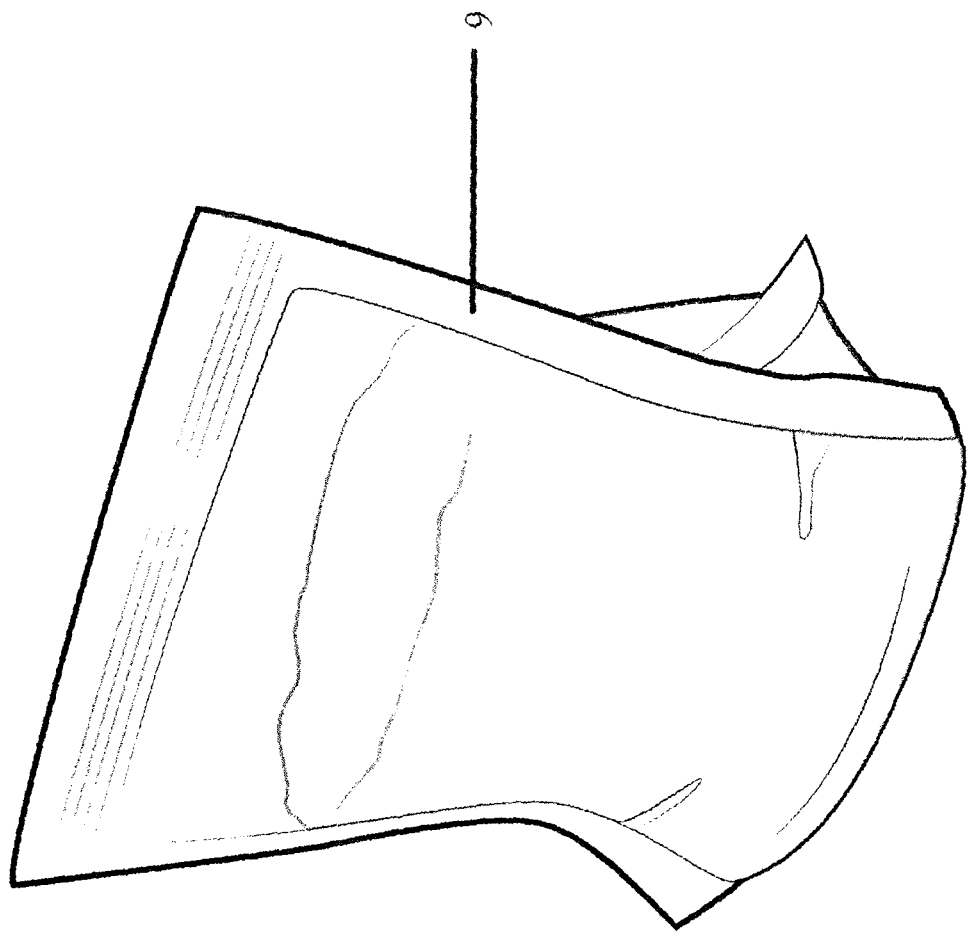
FIG. 8 shows the packet in which coffee grounds are stored.

The present invention utilizes coffee grounds that are stored within a "packet." An example of the packet is shown in FIG. 8. The packet 9 resembles an envelope. Packets with pre-measured amounts of coffee will be available for consumers. However, packets will also be available that will permit users to add an amount of coffee that they prefer. It is critical that the packet be manufactured from a material that will permit water and the oil derived from the grounds to pass through the packet's material, but will not allow the grounds to escape the packet. There are numerous types of materials that will allow water and oil to pass through but will keep the coffee grounds from escaping, and those of skill in the art will recognize such materials may be used to manufacture the packet. In a preferred embodiment, the packet is comprised of material similar to or the same as the material that comprises coffee filters commonly used in the art. Suitable materials (some of which are currently used as coffee filters) include bleached paper, bamboo, nylon or even gold.

Brewing System Components

Figure 1:
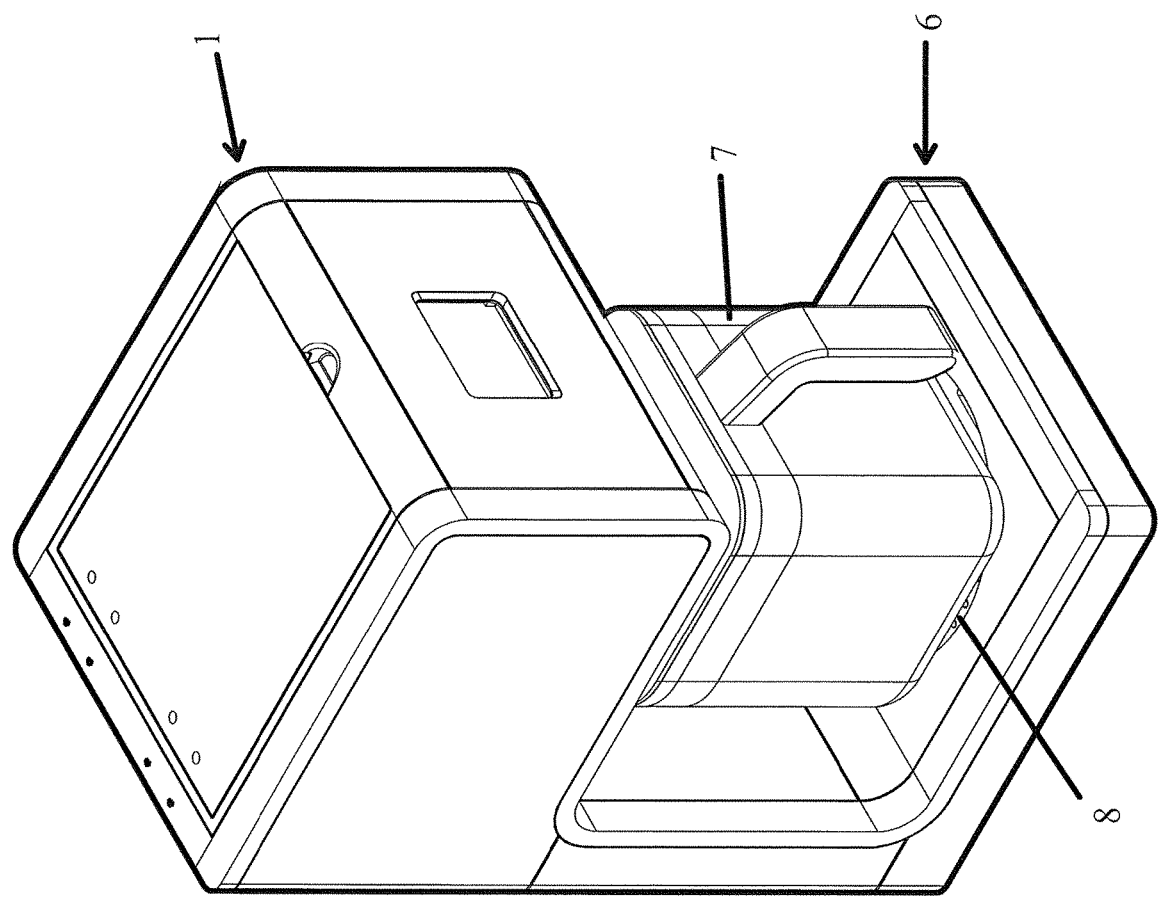
FIG. 1 shows an isometric view of the apparatus.

Now speaking of the components that comprise the present invention, as shown in FIG. 1, from the outside, the look of the present invention resembles many drip coffee systems currently available. But the components within the present system, which are responsible for brewing the coffee, create a coffee brewing system and method for brewing coffee that are novel to the industry.

Structure Generally

As shown in FIG. 3, the present invention includes a free standing structure that includes an "upper portion" 1 that houses a water chamber 2, basket 3, heating means 4, and a means for agitating the basket 5. The invention also includes a "lower portion" 6 that is fashioned so that a carafe 7 (see FIG. 1) or other storage receptacle (including a user's mug) may be situated below the water chamber 2 that is located within the upper portion. The lower portion may optionally include a means 8 (see FIG. 1) for keeping warm any liquid that is stored in the storage receptacle that may be placed below the water chamber.

The Water Chamber & Basket

Figure 5:
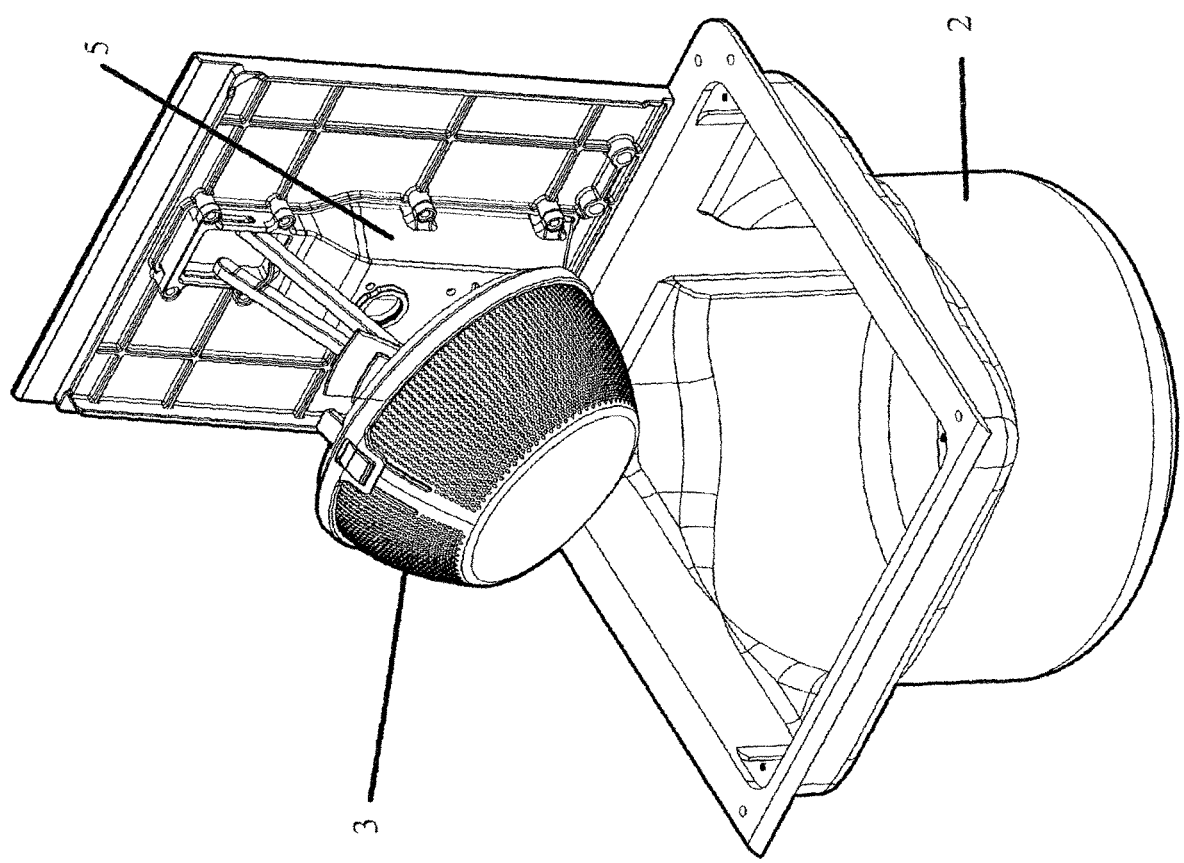
FIG. 5 shows a view of the water chamber, basket, means for agitating, and how the top of the apparatus may open to remove the basket.
Figure 6:
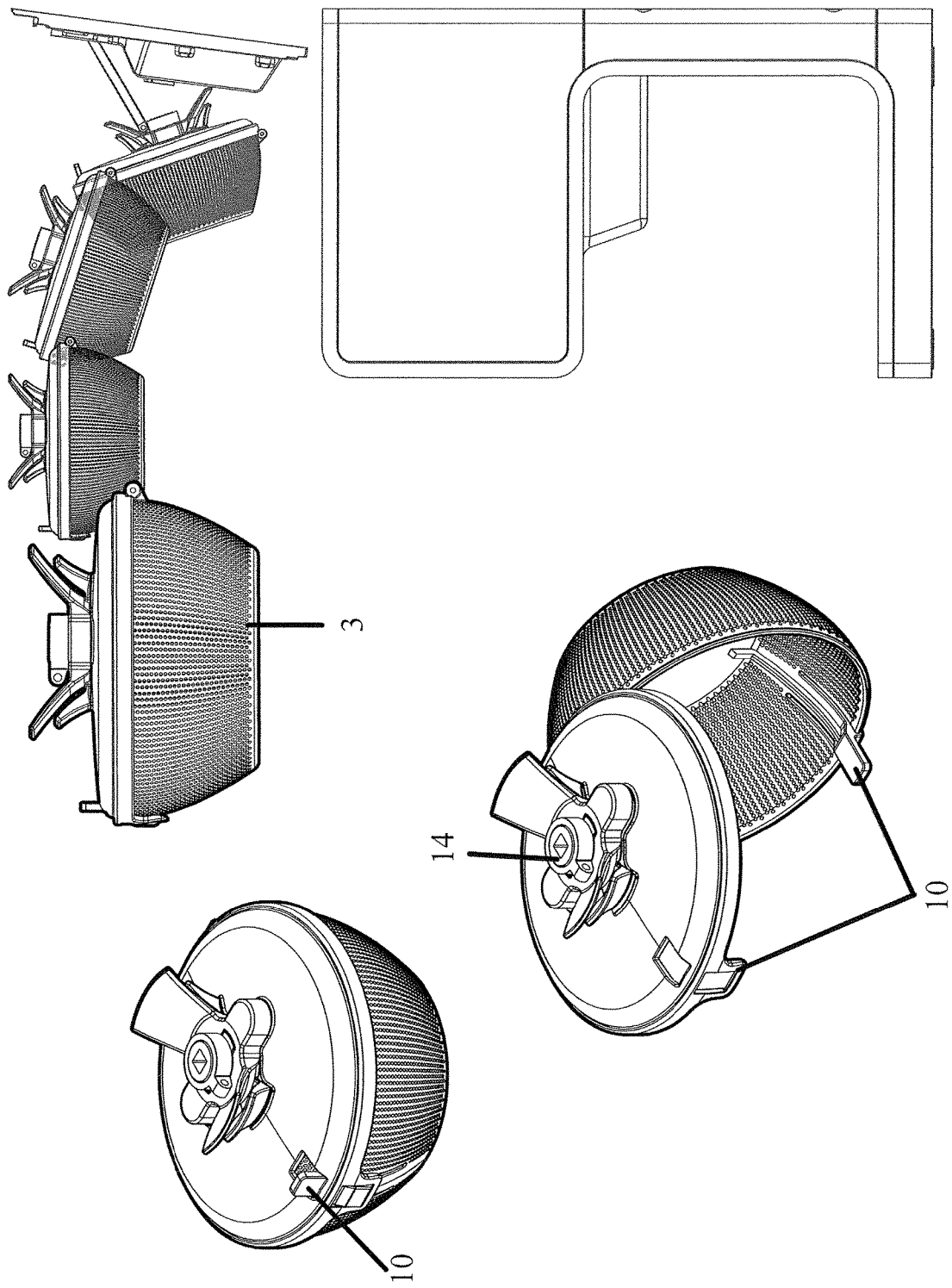
FIG. 6 shows how the basket may be removed from the apparatus.

As shown in multiple Figures included herewith, the upper portion of the present invention includes a chamber for holding water 2. The water chamber 2 may be formed in any shape that enables the present invention to function as described and claimed herein. The present invention may be manufactured so that the user accesses the water chamber by opening any portion of system's upper portion, such as a side panel or the system's top panel. FIGS. 4, 5, and 6 show a preferred embodiment wherein the top panel of the upper portion may be opened to access the water chamber. The water chamber may be manufactured from a variety of materials and those of skill in the art will recognize suitable materials from which to manufacture the water chamber. In a preferred embodiment of the invention, the water chamber is manufactured from stainless steel. Manufacturing the water chamber from stainless steel is advantageous because the chamber will be resistant to corrosion and heat damage, which may otherwise pose problems because the present system heats water within the chamber to a high temperature. In addition, the strength of stainless steel permits the water chamber to be manufactured with thinner walls than would be possible using other materials, which results in a cost savings and allows the overall size of the present system to be reduced, which consumers often prefer.

Within the water chamber, the present invention includes a "basket" 3 into which the user places the packet of coffee grounds. An example of the basket 3 can be seen in FIGS. 4, 5 and 6. The basket 3 must be manufactured so that a user may insert a packet of coffee grounds into the basket and, when brewing is complete, remove the packet from the basket. Those with skill in the art will recognize that there are numerous ways in which the basket may be manufactured so that the packet can be inserted and removed, and all such numerous ways are considered within the scope of the present invention.

The basket must also be manufactured such that water may enter the basket and inundate the packet. There are numerous methods of manufacturing the basket so that water may enter it to inundate the grounds, and those with skill in the art will recognize that such numerous methods exist (all such numerous methods are considered within the scope of the present invention). In a preferred embodiment shown in FIG. 6, the basket 6 is comprised of wire mesh that permits water to enter and exit the basket. Other options include but are not limited to fabricating the basket such that it has "holes" or "slits" that permit water to enter the basket to inundate the packet.

As shown in FIG. 6, the present system may be manufactured so that the basket 3 may be removed from the water chamber 2 (and indeed may be removed from the entire apparatus). Enabling the basket 3 to be removed from the apparatus allows the user to more easily discard the used packet once brewing is complete. Those with skill in the art will recognize that there are numerous means by which the basket may be secured within the water chamber so that it may be removed from the chamber and all such means should be considered within the scope of the present invention. In one possible embodiment shown in FIG. 6, the basket connects to the water chamber via a "universal joint" 14, which is a type of joint well known in the art that allows the basket to be easily disengaged from the water chamber and entirely removed from the system. An additional example of a connection that may be employed is a hooked axle, which also allows the basket to be easily disengaged from the water chamber and entirely removed therefrom. These are, however, only two of the many means of connecting the basket to the water chamber or, as explained below, to a motor that is connected to the water chamber, and all such means are considered within the scope of the present invention.

In addition, the basket 3 may be manufactured so that it can easily discard the packet. This may be accomplished by numerous methods, all of which are well known in the art and all of which are considered within the scope of the present invention. For example, as shown in FIG. 6, the basket 3 may include a "release latch" 10, whereby when a release button is pressed, the latch is released and the basket opens. A hook latch may also be used, but this would require the user to manually unfasten the latch, rather than simply pressing a release button.

Agitation

Agitation is the process of churning or otherwise stirring the coffee grounds while water is extracting oil from the grounds. By sufficiently agitating the grounds during the brewing process, all of the grounds being used to brew a given batch of coffee have the opportunity to interact with the water. To achieve the greatest results using the infusion method of brewing coffee, the grounds should be agitated while the water gradually heats. The Turkish and French press methods of brewing, discussed above, include (at the user's option) a form of agitation when the user manually stirs the grounds. But as noted above, manually stirring the grounds is highly inconvenient for many users.

The present invention achieves agitation by automatic means that frees the user to perform other tasks while the coffee brews. The present invention does so by agitating the basket 6 within the water chamber 2 while the packet 9 is within the basket. There are numerous methods by which one of skill in the art may achieve agitation of the basket, and all such methods should be considered within the scope of the present invention. In one embodiment, the present invention achieves agitation as follows: (i) a motor 5 is installed above the water chamber 2; (ii) the water chamber 2 is filled with water; (iii) the basket 6 is attached to the motor via a universal joint 14; (iv) once the motor 5 is activated, this causes the basket 6 attached to the motor to rotate along a path; (v) the rotating of the basket through the water, which is being gradually heated as further described below, causes the packet within the basket to churn while fully immersed in the gradually heating water, thereby achieving agitation.

Heating Components

As explained further herein, the water within the chamber must be heated from tap temperature to approximately boiling in order to achieve maximum infusion. However, the heating process must occur relatively quickly because users generally are not willing to wait longer than 6-8 minutes for coffee to brew. If a brewing system takes longer than 6-8 minutes to brew the coffee, many users will opt for a system that brews coffee more quickly.

Figure 7:
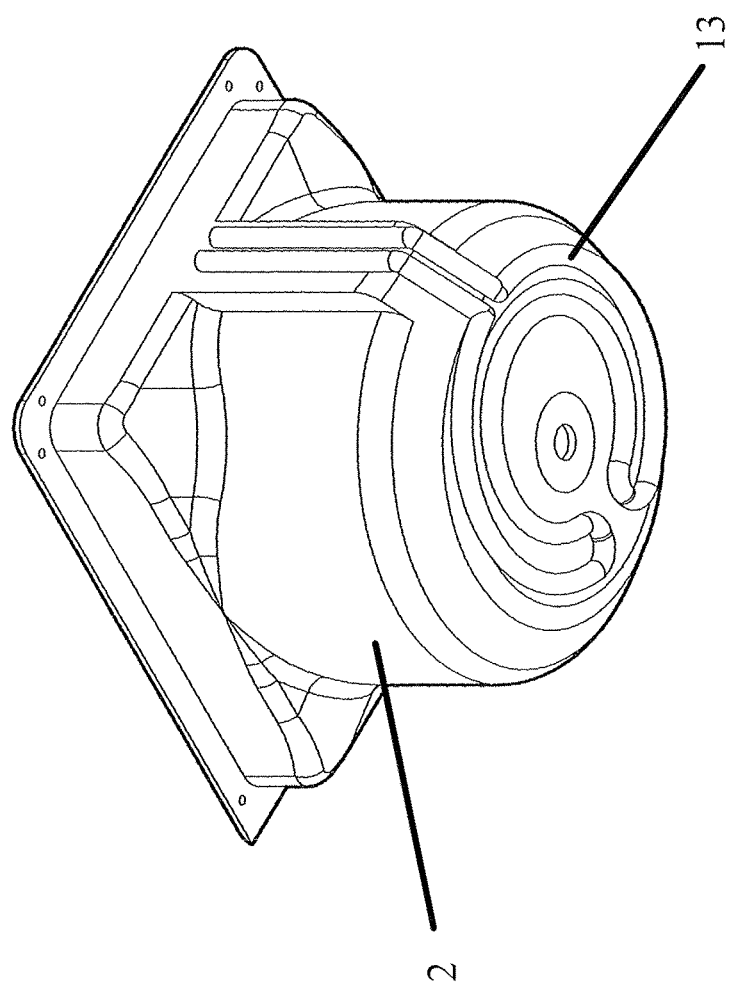
FIG. 7 shows how the means for heating the water chamber may be included in the apparatus.

There are numerous methods by which a person with skill in the art can cause the water within the water chamber to heat, and all such methods should be considered within the scope of the present invention. In a preferred embodiment shown in FIG. 7a, the present invention includes copper coiling 13 that is in contact with the water chamber 2. In FIG. 7a, the copper coiling 13 is in contact with the bottom of the water chamber 2, but the copper coiling may be in contact with any portion of the water chamber, so long as the placement of the copper coiling does not interfere with the present system's operation (for example, the copper coiling may be placed in contact with the sides of the water chamber).

The process of using copper coils to conduct heat is well known in the art. In short, electricity passes through the copper coils, causing them to heat, and the heat of the copper coils is then transferred to the water chamber as a result of the coils contacting the chamber's exterior. Once the chamber itself begins to heat, the heat transfers from chamber to the water stored therein. In a preferred embodiment of the present invention, 1200-1500 watts of electricity should be used to heat the water chamber, as this amount energy will gradually heat the water in the chamber from tap temperature to approximately boiling within the 6-8 minutes time frame in which coffee should be brewed.

The Brewing Process

The process for brewing coffee that is implemented using the present invention has already been described in part above, but for completeness is set forth herein in total. The brewing process includes the following steps:

1) The user accesses the basket 6 and places a packet 9 of coffee grounds therein.
2) The user manually adds water to the water chamber 2. This may be done by opening the apparatus to access the water chamber 2, opening the water chamber 2, and pouring water therein (the user could add water to the chamber before placing the packet into the basket; the order of these two steps is within the user's discretion).
3) Once the packet 9 is placed in the basket 6, water is added to the chamber 2, and the basket 6 and chamber 2 are "closed", then the user may initiate the brewing cycle.
4) The apparatus includes a button (or equivalent means), which upon being pressed by a user will initiate the brewing process.
5) When the brewing process begins, the heating means will begin to heat the water within the chamber from tap temperature toward the approximately boiling temperature.
6) At the time the heating means begins to heat the water, the agitating means begins to agitate the coffee grounds within the gradually heating water.
7) Over the course of 6-8 minutes, the heating means raises the temperature of the water from tap temperature (or another temperature at which water is liquid, but tap temperature is preferred) to approximately boiling and the agitation process occurs throughout the time that the water is heating.
8) Once the heating means has raised the water temperature to approximately boiling, the heating stops (as discussed below, the heating of the water may be controlled by electronic means). At this point, agitation may continue for an additional 30 seconds to one (1) minute.
9) The brewed coffee that has now been created by the heating of the water and agitation of the packet of coffee grounds is now released from the chamber into a storage receptacle situated below the chamber.
10) The apparatus may include means for keeping warm the brewed coffee in the storage receptacle until a user drinks the coffee.

Numerous methods are known in the art for ensuring that the heating means stops heating the water when the water reaches approximately boiling; a heat sensor that relays a signal to stop heating would be one means. All such methods are included within the scope of the present invention. Likewise, numerous methods are known in the art to accomplish the step of draining the brewed coffee from the water chamber into the storage receptacle, and all such methods are considered within the scope of the present invention.

In the preferred embodiment, both the apparatus and the method are controlled by automated, electronic means. The electronic control means enables a user to vary the settings of the apparatus and how it employs the method in order to brew coffee to suit the user's preference. For example, a user could use the electronic control means to program the apparatus to agitate the grounds for less time during the brewing cycle, resulting in a less robust coffee. Electronic control means allows the entire brewing cycle to run from start to finish without additional action by the user once the user has added coffee and water to the system and has used the electronic control means to configure the brew cycle to suit the user's preference and then has pressed the start button (or similar means for initiating the brewing cycle). There are numerous electronic control means that may be used to control the apparatus and method that are well known in the art, and all such means are included within the scope of the present invention. Two of the many examples of such well known electronic control means include: (i) an electronic interface that is able to send instructions to and receive input from the elements of the apparatus, thereby enabling the interface to control each element; and (ii) a standard circuit board with electrical wiring to the elements of the apparatus, where such wiring is able to send instructions to and receive input from each element.

Application to Other Brewed Beverages

The present invention's primary goal is to provide an apparatus and method to enable consumers to more efficiently and economically brew higher quality coffee than can be brewed using the coffee making systems that are currently available. As such, much discussion of the present invention is framed in terms of brewing coffee. But it should be understood that the present invention may be used to brew other beverages in addition to coffee. For example, as many of the same principles that apply to brewing coffee also apply to brewing tea, a user may utilize the apparatus and method disclosed herein to make tea.

What is claimed is:

1. An apparatus for brewing beverages, comprising:
   a water chamber for storing liquid;
   a basket for storing coffee grounds, the basket housed within the water chamber,
   wherein the basket permits liquid to enter therein and exit therefrom;
   a means for heating the liquid stored within the water chamber;
   a motor positioned above the water chamber and coupled to the basket, the motor agitating the basket;
   a means for permitting the liquid stored in the water chamber from exiting the water chamber,
   a heat sensor positioned within the water chamber, the heat sensor detecting a temperature of the liquid stored in the water chamber; and
   an electronic control means operably coupled to the means for heating the liquid, the motor, and the heat sensor, the electronic control means configured to perform processes including:
      heating the liquid stored within the water chamber to approximately a boiling temperature of the liquid via the means for heating the liquid;
      simultaneously agitating the basket, via the motor, in response to heating the liquid; and
      in response to determining the liquid is heated to approximately the boiling temperature:
         discontinue heating the liquid stored within the water chamber, and
         maintaining agitation of the basket for a predetermined period of time via the motor.

2. The apparatus claimed in claim 1, wherein the basket is optionally removed from and again secured to the apparatus.

3. The apparatus claimed in claim 1, further comprising a means for keeping heated to a temperature of at least 150 degrees Fahrenheit the liquid that exits the water chamber.

4. The apparatus claimed in claim 1, wherein the water chamber is comprised of stainless steel.

5. The apparatus claimed in claim 1, wherein the basket is comprised of stainless steel.

6. The apparatus claimed in claim 1, wherein the basket includes openings that permit liquid to enter therein and exit therefrom.

7. The apparatus claimed in claim 1, wherein the means for heating liquid that may be present within the water chamber includes metal heating coils.

8. The apparatus claimed in claim 1, wherein the electronic control means is capable of controlling the means for heating liquid that may be present within the water chamber such that liquid within the water chamber is heated from a beginning temperature of at least 33 degrees Fahrenheit to a maximum temperature of boiling.

9. The apparatus claimed in claim 1, wherein the basket is attached to the motor via a universal joint.

10. The apparatus claimed in claim 7, wherein the metal heating coils are comprised of copper.

11. The apparatus claimed in claim 7, wherein the heating metal heating coils are capable of conducting electricity in the range of 1,200 to 1,500 watts.

12. The apparatus claimed in claim 8, wherein the apparatus is capable of heating the liquid from a beginning temperature of at least 33 degrees Fahrenheit to a maximum temperature of boiling within a time frame of not longer than 8 minutes.

13. The apparatus of claim 1, wherein the electronic control means may be manipulated by a user to alter the manner in which the elements of the apparatus function.

14. An apparatus for brewing beverages, comprising:
   an upper portion including:
      a water chamber for storing liquid;
      a basket for storing coffee grounds, the basket housed within the water chamber,
      wherein the basket permits liquid to enter therein and exit therefrom;
      a means for heating liquid stored within the water chamber;
      a motor positioned above the water chamber and coupled to the basket, the motor agitating the basket; and
      a means for permitting the liquid stored in the water chamber from exiting the water chamber; and
   a lower portion positioned adjacent and below the upper portion, the lower portion including:
      a storage receptacle positioned below the water chamber, the storage receptacle in fluid communication with the means for permitting the liquid stored in the water chamber from exiting the water chamber.

* * * * *